C. W. DAKE.
ADJUSTABLE HUB PLATE.
APPLICATION FILED JULY 21, 1919.
1,393,883.
Patented Oct. 18, 1921.
2 SHEETS—SHEET 1.
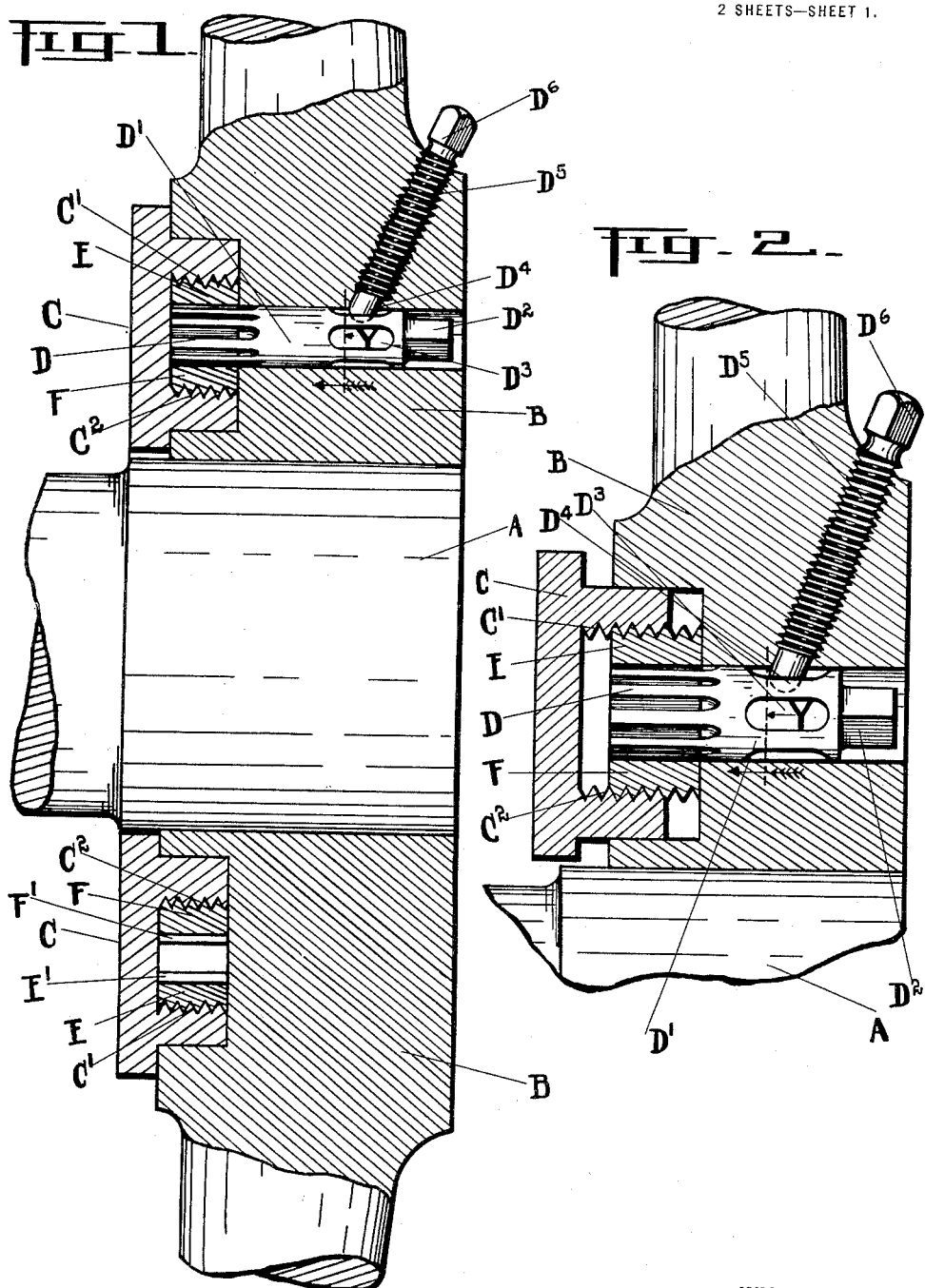
INVENTOR
Charles W Dake
BY Parker & Carter
ATTORNEYS C. W. DAKE.
ADJUSTABLE HUB PLATE.
APPLICATION FILED JULY 21, 1919.
1,393,883.
Patented Oct. 18, 1921.
2 SHEETS—SHEET 2.
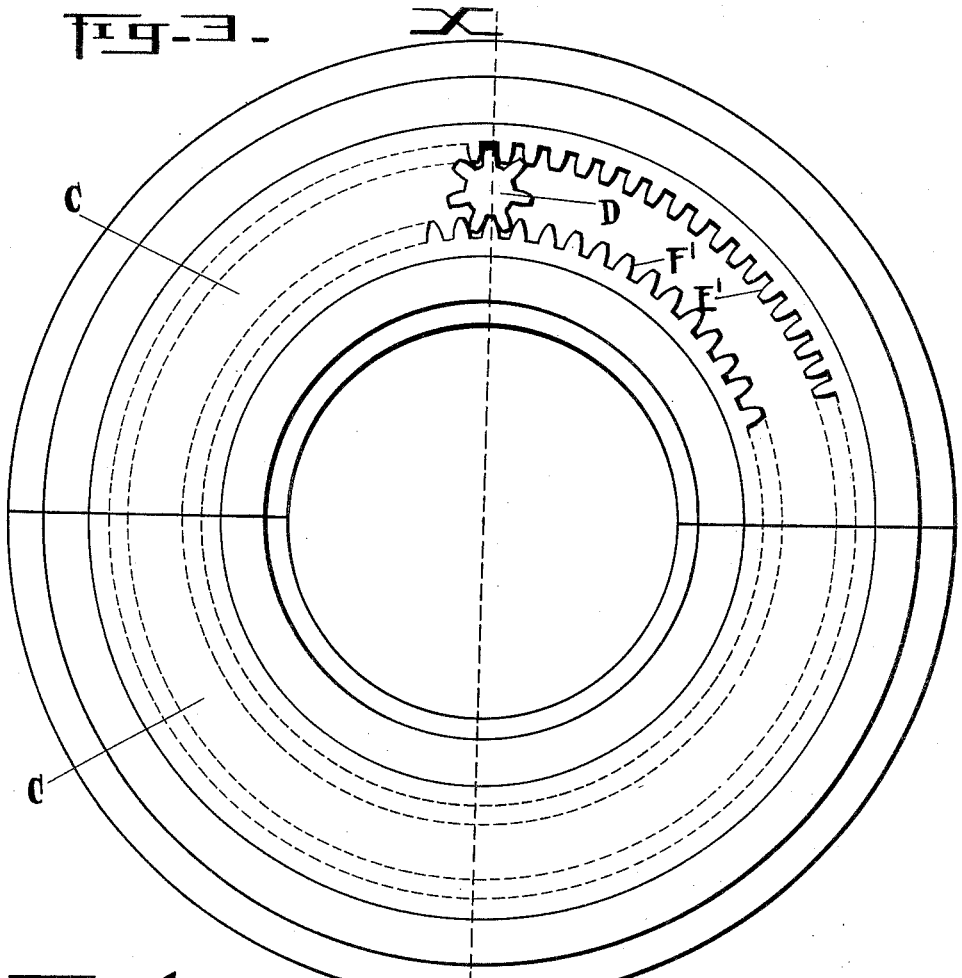
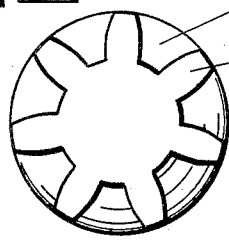
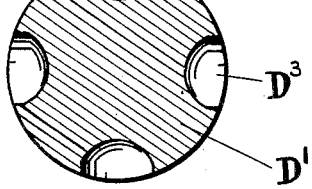
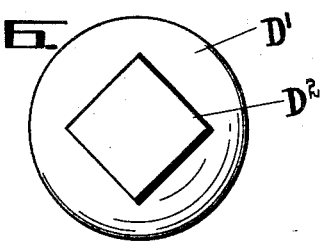
INVENTOR
Charles W Dake
BY Parker Carter
ATTORNEYS

UNITED STATES PATENT OFFICE.

CHARLES W. DAKE, OF CHICAGO, ILLINOIS.

ADJUSTABLE HUB-PLATE.

1,393,883.                Specification of Letters Patent.        Patented Oct. 18, 1921.

Application filed July 21, 1919. Serial No. 312,264.

*To all whom it may concern:*

Be it known that I, CHARLES W. DAKE, a citizen of the United States, residing at Chicago, in the county of Cook and State of Illinois, have invented a certain new and useful Improvement in Adjustable Hub-Plates, of which the following is a specification.

My invention relates to means for adjusting or taking up, to accommodate for wear, hub plates particularly of locomotive driving wheels. Broadly speaking it has to do with the adjustment of hub plates or wearing plates and it relates to means for mechanically advancing such plate to accommodate for wear. The invention is illustrated in the accompanying drawings wherein—

Figure 1 is a cross section of the hub, on the line $x$—$x$ of Fig. 3, with my improvements attached;

Fig. 2, an enlarged detail;

Fig. 3, a plan view of the plate removed from the hub;

Figs. 4, 5 and 6, details.

Like parts are indicated by the same letter in all the figures.

A is the axle, B the wheel hub, C the hub plate, D the pinion like end of a pin $D^1$ having a squared head $D^2$ and a series of surface slots $D^3$ adapted to receive the end $D^4$ of the screw $D^5$ which is provided with a head $D^6$ and is screw threaded into an aperture in the hub. The hub plate C is provided with the outer flange $C^1$ and the inner flange $C^2$, both screw threaded.

E is an outer ring and F, an inner ring, adapted to be received respectively into the screw threads of the flanges $C^1$ and $C^2$. Each of these rings is provided with an internal rack or gear, respectively $E^1$ and $F^1$ to receive the pinion like end D on the pin $D^1$.

I do not wish to be limited to the precise form, structure and arrangement of parts shown, as my drawings are to be taken as part diagrammatic, although in the main they represent a working apparatus.

The use and operation of my invention are as follows:—

The hub, as for example, of a locomotive wheel is recessed and into the recess is inserted the two flanges of the adjustable hub plate. Within the annulus formed by the flanges are placed the two rings which engage the screw threads on the inner sides of the flanges. These parts, of course, are in half circles as indicated by Fig. 3 so that they can be slipped into position without removing the wheel from the axle. The pin with the pinion end is inserted through the hole in the hub, until the pinion lies between the two rings and engages their respective racks or internal gears. When the pin $D^5$ is out of position, a socket wrench can be applied to the head $D^2$ and the pin can be turned on its axis. This will result in rotating the two rings and as they are in screw threaded engagement with the flanges on the adjustable hub plate, they tend to move the hub plate outwardly and this affects the desired adjustment required because of wear on the outside surface of the hub plate. The parts are held in proper position by screwing the pin $D^5$ forward so that its end $D^4$ rests in one of the slots $D^3$ in the body of the pin $D^1$ and thus the parts are locked in the desired position, as for example, in the advance position illustrated in Fig. 2.

I claim:

1. A hub having an annular recess on one side in combination with a plate having two internally threaded flanges, two rings externally threaded to engage said threads on the flanges and means for rotating the rings to advance the plate.

2. A hub having an annular recess on one side in combination with a plate having two internally threaded flanges, two rings externally threaded to engage said threads on the flanges and means for rotating the rings in opposite direction to advance the plate.

3. A hub having an annular recess on one side in combination with a plate having two internally threaded flanges, two rings externally threaded to engage said threads on the flanges and means for rotating the rings to advance the plate, said means including racks on the inside of the rings and rotatable means engaged in said racks.

4. A hub having an annular recess on one side in combination with a plate having two internally threaded flanges, two rings externally threaded to engage said threads on the flanges and means for rotating the rings in opposite direction to advance the plate, said means including racks on the inside of the rings and rotatable means engaged in said racks.

5. A hub having an annular recess on one side in combination with a plate having two internally threaded flanges, two rings externally threaded to engage said threads on the flanges and means for rotating the rings to advance the plate, said means including racks on the inside of the rings and a pinion engaging said racks and means for rotating the pinion.

6. A hub having an annular recess on one side in combination with a plate having two internally threaded flanges, two rings externally threaded to engage said threads on the flanges and means for rotating the rings in opposite direction to advance the plate, said means including racks on the inside of the rings and a pinion engaging said racks and means for rotating the pinion.

7. A hub having an annular recess on one side in combination with a plate having two internally threaded flanges, two rings externally threaded to engage said threads on the flanges and means for rotating the rings to advance the plate, and means for locking the rotating means in position.

8. The combination of a hub, having an annular recess on one side, a transverse hole leading into the bottom of the annulus and an annular hole connected with the first mentioned hole, with a plate having two internally threaded flanges to be received into the recess, two rings externally threaded to engage the threads on the flanges and internally racked, a pin in the transverse hole provided with a pinion to engage the racks, a head whereby it may be turned in the surface recesses, and a second pin screw threaded into the second hole and provided with a head whereby it may be rotated and an end to be received into the recesses in the first pin to lock it in position.

9. A hub having a bearing surface on one side in combination with a plate having two internally threaded flanges, two rings externally threaded to engage said threads on the flanges and means for rotating the rings to advance the plate laterally with reference to the hub.

10. A hub having an annular recess on one side in combination with a plate having two internally threaded flanges, two rings externally threaded to engage said threads on the flanges and means for rotating the rings in opposite direction to advance the plate, said means including racks on the inside of the rings and a pinion engaging said racks and means for rotating the pinion, and means for locking the rotating means in position, comprising a member adapted to be advanced on an axis transversal to that of said pinion, to engage said pinion.

11. A hub having an annular recess on one side in combination with a plate having two internally threaded flanges, two rings externally threaded to engage said threads on the flanges and means for rotating the rings in opposite direction to advance the plate, said means including racks on the inside of the rings and a pinion engaging said racks and means for rotating the pinion, and means for locking the rotating means in position, comprising a screw adapted to be advanced on an axis transverse to that of the pinion, the pinion having a plurality of apertures about its circumference, adapted to receive the end of the screw.

In testimony whereof, I affix my signature in the presence of two witnesses this 16th day of July, 1919.

CHARLES W. DAKE.

Witnesses:
EDITH L. PORTER,
MILDRED H. MACKE.